United States Patent [19]
Renaud

[11] 3,987,481
[45] Oct. 19, 1976

[54] COLOR TELEVISION SIGNAL DEMODULATION SYSTEM

[75] Inventor: Donald E. Renaud, Stone Park, Ill.

[73] Assignee: Motorola, Inc., Chicago, Ill.

[22] Filed: May 9, 1974

[21] Appl. No.: 468,375

[52] U.S. Cl. .................................................. 358/23
[51] Int. Cl.² ......................................... H04N 9/50
[58] Field of Search ................... 358/23, 25; 329/50

[56] References Cited
UNITED STATES PATENTS

| | | | |
|---|---|---|---|
| 3,506,776 | 4/1970 | Rennick | 358/23 |
| 3,558,810 | 1/1971 | Cecchin et al. | 358/23 |
| 3,628,046 | 12/1971 | Bilotti | 358/23 X |
| 3,764,925 | 10/1973 | Von Nikelsberg et al. | 358/23 X |

*Primary Examiner*—Robert L. Griffin
*Assistant Examiner*—Mitchell Saffian
*Attorney, Agent, or Firm*—Maurice J. Jones, Jr.; Harry M. Weiss

[57] ABSTRACT

A silicon monolithic integrated circuit color television demodulator includes three sets of full-wave synchronous switched demodulators for demodulating the red, blue and green color signals or color difference signal present in a composite television signal. Each of the demodulators consists of two pairs of switching transistors, and the transistors in each of the pairs are rendered alternately conductive by reference signals derived from a reference oscillator in a color television receiver. Signals from the reference oscillator at the phases of +(R−Y) and −(B−Y) color difference signals are applied to the red and blue demodulators, respectively. The reference signal for the green demodulator is obtained by applying the +(R−Y) reference signal to one transistor of each of the two pairs of switching transistors in the green demodulator and by applying a portion of the −(B−Y) reference signal to the other transistor in each of the pairs. The modulated color television signal then is supplied in opposite phase to the two pairs of switching transistors in each of the demodulators.

8 Claims, 1 Drawing Figure

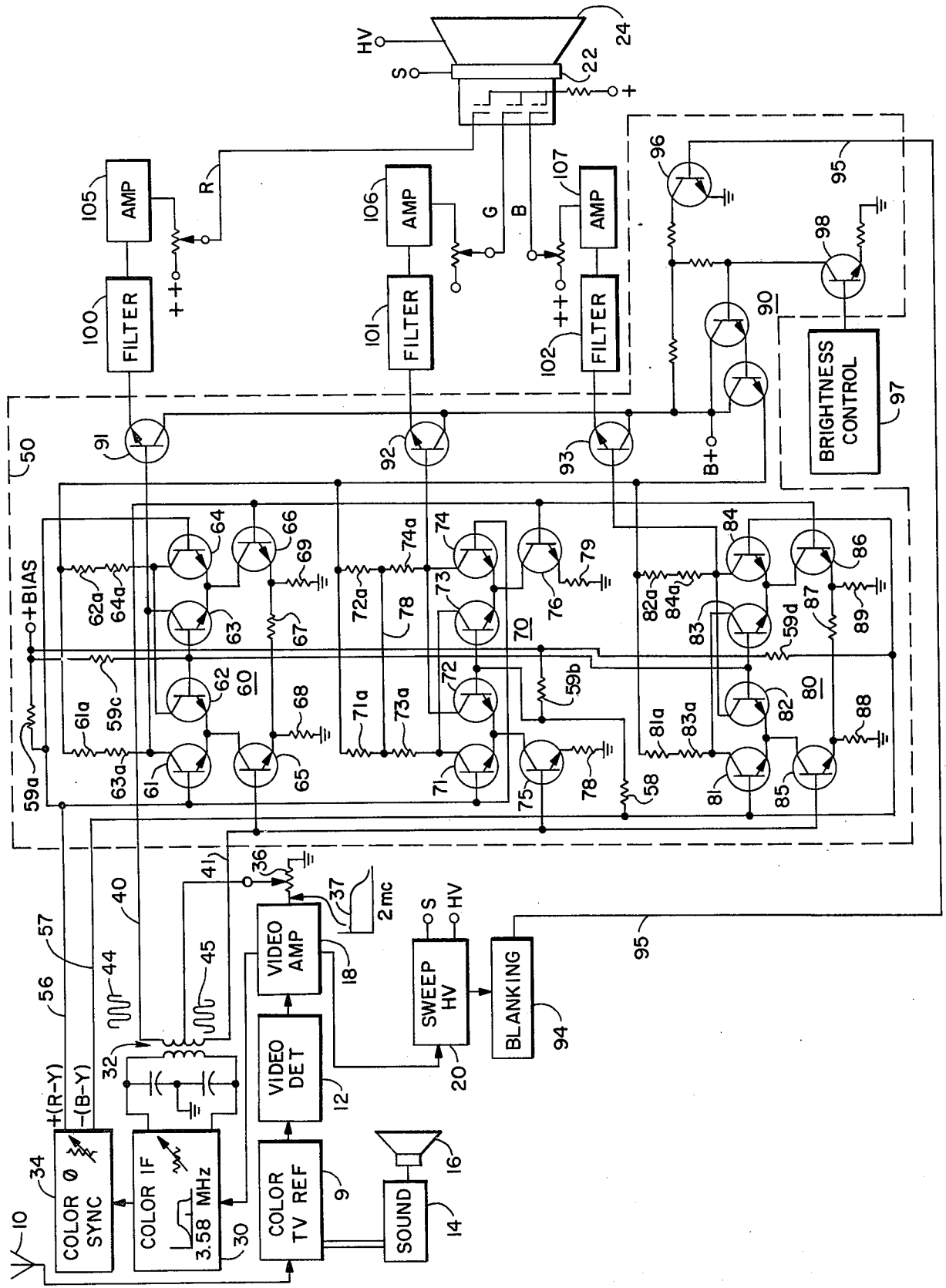

COLOR TELEVISION SIGNAL DEMODULATION SYSTEM

BACKGROUND OF THE INVENTION

In the manufacture of color television receivers, integrated circuits are being used in increasing numbers for performing many of the complex circuit operations of the receivers. The use of such integrated circuits reduces the manufacturing cost of the receivers by substantially reducing the complexity of the manufacture.

One of the circuits of a color television receiver which has been successfully reduced to integrated circuit form is the color demodulator section of the receiver. This is the portion of the television receiver which is used to separate the color signals present in the NTSC color television signal. This signal includes a wideband brightness or luminance (Y) signal, synchronizing burst components, and a modulated chrominance subcarrier signal of approximately 3.58 megahertz. The subcarrier signal is phase and amplitude modulated by color difference signals (R—Y, B—Y, and G—Y), so that different phases of the subcarrier represent different hues of an image portion and the subcarrier amplitude relative to brightness (Y) at each phase represents the saturation of that hue. A monochrome or black and white receiver visibly reproduces only the Y component.

An integrated circuit color demodulator which has been successfully used in a large number of television receivers is disclosed in the U.S. Pat. No. to Cecchin and Hilbert 3,558,810. The demodulator of that patent includes three synchronous gated full-wave demodulators for producing color representative video signals for the red, green and blue guns or cathodes of a color television cathode ray tube. The system of the Cecchin/Hilbert patent is capable of operation as a "direct" demodulator in which the brightness components are applied to the demodulator sections in a push-push or balanced relationship, while the modulated subcarrier signal is applied in push-pull or opposite phases to the demodulator sections. This results in direct demodulation of the color representative signals without the need for any additional matrixing of brightness and color difference signal components.

The demodulator of the patent also is capable of operation as a color difference demodulator if the brightness signals are not applied to it. If this is done, it is necessary to add the brightness signal components to the demodulated color difference signals at some other part of the receiver.

The three demodulator sections of the Cecchin/Hilbert U.S. Pat. No. 3,558,810 are operated with only two reference signals applied to the integrated circuit demodulator from a reference oscillator section. The two signals chosen are representative of the red and blue color difference phases (R—Y and B—Y), and B-Y), and these are applied directly to the red and blue demodulator sections of the integrated circuit. In addition, a resistor adding circuit is used to combine a portion of the red color reference signal with a portion of the blue color reference signal to derive the switching signal applied to the green demodulator section to cause operation of that section at the proper phase.

Each section of a synchronous demodulator requires some predetermined minimum level of the switching signal for proper operation of the demodulator. In the Cecchin/Hilbert demodulator U.S. Pat. No. 3,558,810, the magnitude of the switching signals supplied by the color oscillator must be greater than this minimum amount for demodulation in the red and blue sections in order to supply a sufficient signal to the green section, because of the reduced amplitude of the two color reference input signals which are combined through the resistive adder to form the green demodulator switching signal. It is desirable to effect demodulation in three synchronous demodulators of the type shown in the Cecchin/Hilbert patent, but without requiring the higher level magnitude of the two color reference signals supplied to the demodulator section.

SUMMARY OF THE INVENTION

An object of this invention is to provide an improved synchronous color demodulator.

Another object of this invention is to provide the reference or switching signals for first and second synchronous demodulators from a reference oscillator at different phases to effect demodulation in those two demodulators and to use those same reference signals applied to different inputs of the third demodulator in a predetermined ratio to effectively operate the third demodulator at the proper phase to demodulate a third color difference signal.

A preferred embodiment of this demodulation system includes three synchronous, gated full-wave demodulators each capable of producing a different color representative video signal in a television receiver. Each of the demodulators is controlled by a color reference signal having a phase associated with a particular color or color-difference signal. Two pairs of switch devices are provided in each demodulator section and the switch devices of each pair are alternately rendered conductive, with one of the switch devices in each pair being simultaneously rendered conductive with a corresponding switch device in the other pair. Opposite phases of the chrominance signal are respectively fed to input devices for each of the demodulators.

The reference signal source supplies two phases of signals, each of which is supplied directly to a different one of the three demodulators. Each of the reference signals also is applied to a different one of the switch demodulator in a predetermined ratio to operate the third demodulator at the desired third phase without requiring three reference signals from the reference signal source.

BRIEF DESCRIPTION OF THE DRAWING

The sole FIGURE of the drawing is a circuit diagram, partially in block form, of a television receiver incorporating a color demodulator in accordance with a preferred embodiment of this invention.

DETAILED DESCRIPTION

Referring now to the drawing, the demodulator system of a preferred embodiment of this invention is shown interconnected with a color television receiver to illustrate the manner in which the demodulator may be used with such a receiver. The color television receiver 9 is coupled to a suitable antenna 10 to receive a signal and to select, amplify, and convert the signal to an IF frequency for application to a video detector 12. In addition, the color receiver circuit 9 also is coupled to a sound system 14 which demodulates and amplifies the usual 4.45 megahertz sound subcarrier to be reproduced by a speaker 16 as audio signals.

The video detector 12 is coupled to a video amplifier 18 having outputs to the various remaining stages of the receiver. The horizontal and vertical beam synchronizing pulses of the signal are selected by a sweep and high voltage system 20 which has an output (S) coupled to the deflection yoke 22 on the neck of a three-beam color cathode ray tube 24. The system 20 also provides a high voltage (H.V.) output for the screen of the shadow mask of the cathode ray tube 24. The video amplifier 18 further is coupled to a color or chroma subcarrier IF amplifier 30 which includes band-pass filter networks for selecting the color subcarrier at 3.58 megahertz and its associated sidebands. The amplifier 30 includes a gain or color intensity control to furnish a selected amplitude of the chrominance subcarrier signal of opposite phases with respect to ground at the primary winding of the transformer 32.

In addition, the color IF amplifier 30 is coupled to a color synchronizing oscillator 34 which selects the burst signal components appearing on the "back porch" of the horizontal synchronizing pulses of the composite signal in order to develop a color reference signal of 3.58 megahertz for synchronous demodulation of the color signals. The oscillator 34 also includes a control for shifting the phases of the two different output signals produced, thereby shifting the demodulation angle slightly and affording a color shift in the reproduced image. This control is what is known as the "hue" control of a television receiver.

The video amplifier 18 also includes a variable contrast control 36, across a selected portion of which the wideband luminance signal (Y) is developed with respect to ground. This is applied to the center tap of the secondary winding of the transformer 32. The luminance or brightness signal (Y) available at the control 36 may extend in frequency range 37 up to or into the chroma sub-carrier sidebands. Application of the brightness signal components to the center tap of the secondary winding of the chrominance transformer 32 is used for operation of the system as a direct demodulator in which the brightness and chrominance components are supplied together to the demodulator section of the receiver to directly reproduce the red, green and blue color representative signals. If operation of the receiver as a direct demodulator is not desired, the brightness signal components would not be applied to the center tap of the secondary winding 32 but would be supplied through a separate circuitry to be combined with the output of the demodulator in a matrix circuit. In such a case, the demodulator then would reproduce at its outputs the color difference signals (R−Y, B−Y and G−Y) which, when added to the Y component, then would produce the R, B and G color representative signals.

The secondary winding of the transformer 32 has two output leads 40 and 41. Both of these leads carry the same brightness component with respect to ground. The lead 40 carries the modulated chroma subcarrier 44 of one phase, and the lead 41 carries the modulated chroma subcarrier 45 of opposite phase. The signals 44 and 45 are phase-modulated to represent hue and are amplitude modulated to represent saturation.

Each of the leads 40 and 41 are coupled to three synchronous, gated, integrated circuit color demodulators 60, 70 and 80 located on an integrated circuit chip 50, which is indicated by dotted lines in the drawing. Output signals obtained from the color demodulators 60, 70 and 80 are applied through associated filters 100, 101 and 102, respectively, to video output amplifiers 105, 106 and 107, at the output of which the video signals representing red, green and blue are developed. Each of the amplifiers 105, 106 and 107 includes a variable resistor connected to a cathode of the three-beam cathode ray tube 24, and these cathodes are part of the red, green and blue electron guns in the color picture tube 24. Associated grids of these cathodes are coupled to a suitable bias source, and the tube 24 operates in accordance with known shadow mask principals to reproduce a monochrome or full color image in accordance with the video drive signals which are applied to it.

In the receiver which has been described generally thus far, there may be additional circuits which are known but which have not been disclosed in detail in order to simplify this disclosure. For example, such receivers often include a gated automatic gain control system, a color killer system for interrupting the amplifier 30 in the absence of a color signal, as well as other circuitry known and used in commercially produced color television receivers. It further should be noted that it is preferable for the video detector 12 to be direct current coupled to all of the succeeding amplifiers and demodulators to the cathodes of the color picture tube 24 in order to maintain constant the direct current components of the signals processed in the various translation paths.

Referring now more particularly to the integrated circuit color demodulator system 50 shown on the drawing, the three gated, synchronous, full-wave demodulators 60, 70 and 80 all are substantially the same. Each includes two pairs of switching transistors identified as 61, 62 and 63, 64 in the demodulator 60. The demodulator 60 also includes two input transistors 65 and 66. Similarly numbered switching transistors and input transistors are found in the demodulators 70 and 80. The demodulators 60, 70 and 80 all operate in essentially the same manner; and for the purposes of explaining this operation, the description will be limited to the demodulator 60, except for the differences in the manner the input switching signals are applied to the demodulator 70, as is described subsequently.

The +(R−Y) color reference signal derived from the oscillator 34 is applied over a lead 56 to the bases of the switching transistors 61 and 64. The bases of the switching transistors 61 and 64 also are supplied with positive direct current biasing potential from a suitable source through an isolating resistor 59a. Biasing potential also is applied to the bases of the switching transistors 62 and 63 through a similar resistor 59c. Collector potential for the transistors 61, 63 and 62, 64 is supplied respectively through collector resistors 61a, 63a and 62a, 64a from an output transistor 90 in an automatic brightness control circuit. The emitters of the transistors 61 and 62 are connected together at a terminal with the collector of the input transistor 65, and the emitters of the transistors 63 and 64 are connected together at a terminal with the collector of the input transistor 66.

The +(R−Y) reference oscillator signals on one-half of the reference signal cycle render the transistors 61 and 64 conductive together, while at the same time causing the transistors 62 and 63 to be driven non-conductive. On the opposite half-cycles of the +(R−Y) reference signal, the transistors 61 and 64 are driven non-conductive, while the transistors 62 and 63 are rendered conductive. This operation occurs for each cycle of operation of the +(R−Y) signal obtained from the oscillator 34; so that the transistors 61, 62 and 63, 64 in each of the pairs of switching circuits of the demodulator 60 are alternately rendered conductive.

The input transistor 65 is supplied with the modulated subcarrier signal 45, and the input transistor 66 is supplied with the opposite phase modulated subcarrier signal 44. Both of the input transistors 65 and 66 are supplied with the same phase of the brightness signal 37, present at the center tap of the secondary winding of the transformer 32. Since the frequency of the signals obtained from the output of the oscillator 34 is the same as the frequency of the suppressed carrier for the modulated color signal, the demodulators 60, 70 and 80 are operated as gated synchronous demodulators. The alternate symmetrical synchronous gating or switching of the switching transistors, such as 61, 62, 63 and 64 in the demodulator 60 has the effect on the opposite phase chroma signals applied to the bases of the transistors 65 and 66 to provide a full-wave recovery of the modulated information at the output terminals.

A pair of output terminals are available from each of the demodulators 60, 70 and 80. For example, transistors 61 and 63 have their collectors coupled together to provide a first one of these output terminals; and the transistors 62 and 64 have their collectors coupled together to provide a second of these output terminals for the demodulator 60. Since the output signals available from each of the two different output terminals of the demodulators are of opposite phase, the desired phase of output signals is selected merely by chosing whichever one of the two output terminals provides that desired phase. For the demodulator 60, the desired phase is illustrated as obtained from the interconnected collectors of the transistors 61 and 63; and this output is connected to the base of an emitter-follower output transistor 91 to produce the red output signal.

In a similar manner, the reference frequency signal −(B−Y) on the lead 57 is applied to the demodulator 80. The demodulator 80 operates in the same manner as the demodulator 60, so that a detailed description of its operation is not given here. Because the phase of the reference signal on the lead 57, however, is the −(B−Y) oscillator reference signal, the output used from the demodulator 80 is the opposite phase from that used for the demodulator 60. For example, the output of the demodulator 80 is obtained from the cross-connected collectors of the switching transistors 82 and 84 and is applied to the base of an emitter-follower output transistor 93.

By selecting the opposite phase of output from the demodulator 80, the blue reference signal applied to the base of the transistor 92 has the proper phase relationship with the red signal applied to the base of the transistor 91. If a +(B−Y) signal appeared on the lead 57 for operating the switching demodulator 80, the output of the demodulator 80 then would be taken from the same corresponding terminals as that of the demodulator 60. The −(B−Y) reference signal, however, is used in order to effect improved operation of the green demodulator 70.

It should be noted that although all of the demodulators 60, 70 and 80 are operated in the same manner, the phase of the reference switching signal applied to the transistors 61 to 64, 71 to 74, and 81 to 84 is different for each demodulator in order to effect recovery of the desired color signals or color difference signals. As indicated previously, the oscillator 34 provides outputs for the +(R−Y) and −(B−Y) phase reference signals. The oscillator 34, however, does not need to supply a third phase signal for the green demodulator 70.

The signal for driving the switching transistors 71 to 74 of the demodulator 70 may be derived from the signals present on the output leads 56 and 57 from the oscillator 34. In the aforementioned Cecchin/Hilbert patent this was accomplished by coupling a portion of the signals present on each of the oscillator outputs through a resistor matrix network to the green demodulator to effect operation of that demodulator. While that system operated properly to provide the desired demodulated outputs, it required the two signals obtained from the output of the reference oscillator to be of greater magnitude than the minimum required to operate the switching transistors in the red and blue demodulators. The reason for this was that it was necessary to compensate for the losses in the resistor matrix coupled to the input of the green demodulator in order to supply the minimum switching signal required to operate the switching transistors of that demodulator of the patent.

In the circuit shown in the drawing, the signals supplied by the oscillator 34 on the leads 56 and 57 can be of the minimum magnitude required to switch the demodulators 60 and 80. These signals then are combined to produce a resultant vector signal of more than the minimum amplitude needed to cause the switching of the demodulator 70. To accomplish this, the +(R−Y) signal is applied directly to the bases of the switching transistors 71 and 74 of the green demodulator 70 in the same manner that this signal is applied to the switching transistors 61 and 64 of the red demodulator 60. In addition, however, a reduced portion of the −(B−Y) signal is applied through a resistor 58 to the bases of the switching transistors 72 and 73 of the green demodulator. Direct current bias for the switching transistors of the demodulator 70 is applied through the isolating resistors 59a and 59b.

To understand how this is accomplished, assume the reference signals on the leads 56 and 57 each are one unit of magnitude. The value of the resistor 58 is selected to cause approximately 0.316 units of the −(B−Y) signal amplitude on the lead 57 to be applied to the bases of the switching transistors 72 and 73 when the full amplitude +(R−Y) signal is applied to the transistors 71 and 72. The result of applying the signals on the leads 56 and 57 to the switching demodulator 70 in the manner described above, is to cause the vector addition of these signals in the desired amounts to produce what effectively amounts to a reference signal having an amplitude of approximately 1.05 units. This occurs within the demodulator 70 to result in operation of the switching transistors of the demodulator 70 at the −(G−Y) reference signal phase. No longer is there any necessity for combining the R−Y and B−Y signals in a resistor matrix prior to applying them to the demodulator 70. In the circuit shown, the switching action and the combination to produce the operation at the desired phase all occur simultaneously in the demodulator switching transistors 71, 72, 73 and 74.

The advantage of operating the circuit in this manner is that the vector addition of the full amplitude of the +(R−Y) signal and the reduced amplitude portion of the −(B−Y) reference signal produces a resultant reference signal for the green demodulator which is greater in amplitude than the amplitudes of the signals appearing on either of the leads 56 and 57. This can readily be determined by reference to a conventional color television phase diagram. The reason that the −(B−Y) signal is used is that in order to effect the simultaneous combination of the two reference signals applied to the demodulator 70, it is necessary to apply them to the bases of different transistors in each of the switching transistor pairs of the demodulator 70. This results in an out-of-phase application of the signals, but by using the −(B−Y) signal, the resultant operation of the demodulator 70 is the same as if +(R−Y) and +(B−Y) reference signal phases were added together and applied to the same terminal of the demodulator.

Since the resultant vector amplitude of the composite switching signals applied to the demodulator switching transistors 71 to 74 is greater than the switching signals applied to the demodulators 60 and 80, it is possible to supply the minimum amplitude signals on the leads 56 and 57 which are necessary to effect proper switching operation of the demodulators 60 and 80. This results in a substantially reduced amplitude of the oscillator input into the integrated circuit 50 for the same performance compared with the circuit of the aforementioned Cecchin/Hilbert patent.

The desired G−Y output is realized from the demodulator 70 by using the "negative" demodulated output obtained from the collectors of the switching transistors 72 and 74 in a manner similar to the output obtained from the demodulator 80. This availability of the negative demodulated signal from the demodulator 70 eliminates the necessity for providing a 180°phase shift in the green demodulator drive or in the green demodulator output signal.

As stated previously, the luminance for Y component of th signal is applied to the center tap of the secondary winding of the transformer 32 resulting in its application in the same phase, or "push-push" to the inputs of all of the input transistors in each of the demodulators 60, 70 and 80. The result of this is to effect direct demodulation of the chrominance and luminance components so that the signals applied to the bases of the transistors 91, 92 and 93 are directly the color representative signals for red, green and blue (R, G, B). The manner in which this is accomplished is described in detail in the aforementioned U.S. Pat. No. 3,558,810, so that that operation will not be described here. If such direct demodulation is not desired, the Y component is not applied to the center-tap of the secondary winding. The demodulators 60, 70 and 80 then will operate as color difference demodulators to produce R−Y, B−Y and G−Y output signals.

In addition, U.S. Pat. No. 3,558,810 describes the operation of the demodulator to effect adjustment of the relative amplitudes of the color or chrominance signal components without varying the brightness signal components through the use of the shunts 67, 78 and 87. These form no part of the present invention so that no description of this operation is given here.

The nature of the alternate gating or on/off gating used in the synchronous demodulators 60, 70 and 80 is such as to prevent the 3.58 megahertz reference signal components from appearing on the outputs, significantly reducing the filtering requirements of the demodulator circuits. In order to insure that this type of operation occurs, however, it is desirable that the current flowing in each of the paths for the switching devices in each of the demodulators be relatively closely matched. The most critical components in this regard on the integrated circuit chip on which the demodulator circuits are formed, are the emitter resistors 68–69, 78–79 and 88–89 connected to the emitters of the respective transistors 65–66, 75–76, and 85–86. The match of the input transistors, such as 65 and 66 is not unduly critical, but the base source impedance for these transistors should be kept relatively low for fast operation. The match of the gating transistors such as 61, 62, 63 and 64 is not a problem so long as sufficient gate drive is made available to switch these transistors fully on and off. This is the minimum magnitude of the output voltages of the signals obtained from the output of the oscillator circuit 34. As stated previously, it only is necessary to provide sifficient drive to fully switch on and off the transistors of the demodulators 60 and 80. This inherently then provides more than sufficient drive to switch on and off the switching transistors 71 to 74 of the demodulator 70.

Horizontal and vertical retrace blanking functions may be incorporated into the design of the integrated circuit demodulator 50, and this has been implemented in the circuit shown in the drawing by reducing the supply voltage to the collector of the switching transistors in the demodulators 60, 70 and 80 during the retrace periods. Blanking control is supplied to the integrated circuit chip 50 over the lead 95, and the transistor 96 and Darlington transistor 90 operate to effect blanking of the demodulator circuits in the manner described in the aforementioned Cecchin/Hilbert U.S. Pat. No. 3,558,810. Brightness control also is effected through the Darlington amplifier 90 by an external brightness control circuit 97 coupled to the base of an NPN transistor 98.

From the foregoing, it may be seen that an effective improved synchronous gated color demodulator circuit for direct demodulator of color and brightness components, and also capable of demodulation of the color difference components, is provided by the integrated circuit 50. The circuit connections to the reference oscillator 34 permit utilization of minimum amplitude output signals from the oscillator 34 to reduce the power requirements of the oscillator and to reduce the magnitude of drive applied to the demodulator to a minimum level for effective demodulation of the color components of the composite color television signal.

I claim:

1. A demodulator for demodulating a color television signal comprising at least a subcarrier signal modulated by color difference signals representing hue and saturation of the image at different phases of the subcarrier, the demodulator including in combination:
   at least one differential switching circuit including first and second switching devices interconnected at a first common signal input terminal and having first and second switching input terminals, respectively, and at least one output coupled with at least one of said first and second switching devices, said first and second switching devices being adapted for alternately switching in response to first and second reference signals respectively applied to said first and second switching input terminals thereof, the first switching device being rendered non-conductive in response to said first reference signal when the second switching device is rendered conductive in response to said second reference signal and vice-versa;
   means for applying said first reference signal at the subcarrier frequency and at a first phase to the first switching input terminal for the first switching device;

another means for applying said second reference signal at the subcarrier frequency and at a second phase to the second switching input terminal of said second switching device;

signal supply means for supplying the color television subcarrier signal to said common signal input terminal of said first and second switching devices; and a second differential switching circuit including third and fourth switching devices, said third and fourth switching devices interconnected at a second common signal input terminal and having third and fourth switching input terminals, respectively, the first and fourth switching input terminals being interconnected and the second and third terminals being interconnected.

2. The combination according to claim 1 wherein said first and second switching devices each comprise transistors each having collector, base and emitter electrodes, the emitters thereof coupled together at said common signal input terminal and the bases thereof comprising said first and second switching inputs, respectively.

3. The combination according to claim 1 wherein said first, second, third and fourth switching devices all are transistors of the same conductivity type, each having base, collector and emitter electrodes, wherein the emitter electrodes of said first and second transistors are interconnected to said first common signal input terminal and the emitter electrodes of said third and fourth transistors are interconnected to said second common signal input terminal, the bases of said first and fourth transistors are interconnected to said means for applying said first reference signal, the bases of said second and third transistors are connected to said means for applying said second reference signal, the collectors of said first and third transistors are interconnected at a first output terminal and the collectors of said second and fourth transistors are interconnected at a second output terminal.

4. A demodulator system for demodulating a color television signal including at least a subcarrier signal component modulated by color difference signals representing hue and saturation of an image at different phases of the subcarrier, said demodulator system including in combination:

first, second, and third balanced synchronous demodulating circuits, each for demodulating different phases of the subcarrier signal and each having at least one signal input and first and second reference inputs;

first means for supplying a first reference signal at the subcarrier frequency and at a first phase to one of the first and second reference inputs of said first demodulating circuit;

second means for supplying a second reference signal at the subcarrier frequency and at a second phase to one of the first and second reference inputs of said second demodulating circuit;

means coupled with said first means for supplying a predetermined portion of said first reference signal to the first reference input of said third demodulating circuit; and another means for supplying a predetermined portion of said second reference signal to the second reference input of said third demodulating circuit.

5. The combination according to claim 4 wherein each of said three demodulating circuits comprises first, second, third and fourth switching transistors of the same conductivity type, each of said switching transistors having base, collector and emitter electrodes, wherein the emitter electrodes of said first and second transistors are interconnected to form a first signal input for each of said demodulating circuits, the emitter electrodes of said third and fourth transistors are interconnected to form a second signal input for each of said demodulating circuits, the bases of said first and fourth transistors of each of said demodulating circuits are interconnected to form a first reference input thereto, the base electrodes of the second and third transistors of each demodulator are interconnected to form a second reference input thereto, with the first reference inputs for said first and second demodulating circuits being coupled with said first and second means for supplying said first and second reference signals, respectively, and said second reference input of said first and second demodulating circuits being coupled with a source of reference potential, said first reference input of said third demodulating circuit being coupled to receive a predetermined portion of said first reference signal and the second reference input of said third demodulating circuit being coupled to receive a predetermined portion of said second reference signal.

6. The combination according to claim 5 wherein said first reference signals are at a phase corresponding to $+(R-Y)$ and said second reference signals are at a phase corresponding to $-(B-Y)$, and the collectors of said first and third transistors of said first demodulating circuit are interconnected to form an output terminal for said first demodulating circuit, and the collector electrodes of said second and fourth transistors of each of said second and third demodulating circuits are interconnected to form output terminals for said second and third demodulating circuits.

7. The combination according to claim 5 further including first and second signal supply circuits coupled with said first and second signal inputs, respectively, of each of said demodulating circuits, said first signal supply circuit providing the modulated subcarrier signal at one phase to said first input and said second signal supply circuit providing the modualted subcarrier signal at opposite phase to the second signal input terminal of each of said demodulating circuits.

8. The combination according to claim 7 wherein said first reference signal is supplied to the first reference input of first and third demodulating circuits, said second reference signal is supplied directly to the first reference input of said second demodulating circuit, and further including first resistance means coupled between the second reference input of said third demodulating circuit and the first reference input of said second demodulating circuit for applying said predetermined portion of said second reference signal to the bases of said second and third transistors of said third demodulating circuit.

* * * * *